United States Patent [19]

Wolf et al.

[11] Patent Number: 5,342,643
[45] Date of Patent: Aug. 30, 1994

[54] PROTEIN/ALKYLENE GLYCOL ALGINATE COMPLEX AS AN EMULSIFIER AND STABILIZER

[75] Inventors: Peter A. Wolf, Valhalla, N.Y.; Kenneth Clare, deceased, late of Vista, Calif., by Jean Clare, executor; Kun P. Kuo, Katonah, N.Y.

[73] Assignee: PepsiCo Inc., Purchase, N.Y.

[21] Appl. No.: 777,118

[22] Filed: Oct. 16, 1991

[51] Int. Cl.⁵ .................................................. A23L 2/00
[52] U.S. Cl. ...................... 426/590; 426/601; 426/602; 426/575; 426/656
[58] Field of Search ............... 426/601, 602, 575, 590, 426/656

[56] References Cited

U.S. PATENT DOCUMENTS

| | | |
|---|---|---|
| 2,121,305 | 6/1938 | Schrader et al. . |
| 2,391,559 | 12/1945 | Faulkner . |
| 2,455,820 | 12/1948 | Steiner . |
| 2,543,699 | 2/1951 | Gloahec . |
| 2,584,123 | 2/1952 | Gruenwald . |
| 3,353,961 | 11/1967 | Simon . |
| 3,378,373 | 4/1968 | von Rintelen et al. . |
| 3,407,076 | 10/1968 | Ganz . |
| 3,525,624 | 8/1970 | Rubenstein . |
| 3,652,291 | 3/1972 | Bedoukian . |
| 3,792,175 | 2/1974 | Schmitt . |
| 3,829,412 | 8/1974 | Kunz . |
| 3,842,062 | 10/1974 | Eastman . |
| 3,857,978 | 12/1974 | Schwartz et al. . |
| 3,896,241 | 7/1975 | Malaspina et al. . |
| 3,944,680 | 3/1976 | van Pelt et al. . |
| 3,949,098 | 4/1976 | Bangert . |
| 4,009,289 | 2/1977 | Roos et al. . |
| 4,015,025 | 3/1977 | Szczesniak . |
| 4,209,545 | 6/1980 | Schapiro . |
| 4,348,418 | 9/1982 | Smith .................................. 426/575 |
| 4,411,926 | 10/1983 | Trumbetas et al. . |
| 4,548,823 | 10/1985 | Morimoto ........................... 426/575 |
| 4,560,570 | 12/1985 | Rausing ............................... 426/575 |
| 4,582,710 | 4/1986 | Ooralkue ............................. 426/575 |
| 4,615,900 | 10/1986 | Schentz et al. . |
| 4,880,654 | 11/1989 | Okada ................................. 426/575 |
| 4,882,194 | 11/1989 | Rapp ................................... 426/575 |
| 5,100,688 | 3/1992 | Cox ..................................... 426/575 |

FOREIGN PATENT DOCUMENTS

| | | | |
|---|---|---|---|
| 57-99175 | 6/1982 | Japan ................................... 426/575 |
| 58-129957 | 8/1983 | Japan ................................... 426/575 |
| 60-120958 | 6/1985 | Japan ................................... 426/575 |
| 61-1358 | 1/1986 | Japan ................................... 426/575 |
| 63-269 | 1/1988 | Japan ................................... 426/575 |
| 1494912 | 12/1977 | United Kingdom . |

OTHER PUBLICATIONS

Tokaev, et al., *Die Nahrung*, 31, No. 8, 825–834 (1987).

*Primary Examiner*—Carolyn Paden
*Attorney, Agent, or Firm*—Scully, Scott, Murphy & Presser

[57] ABSTRACT

The present invention relates to a stable emulsion system comprising a native protein/alkylene glycol alginate complex stabilizer. The emulsifying system is particularly suited for employment in acidic beverages, food comestibles and personal care products which require stable oil-in-water emulsions.

11 Claims, No Drawings

PROTEIN/ALKYLENE GLYCOL ALGINATE COMPLEX AS AN EMULSIFIER AND STABILIZER

FIELD OF THE INVENTION

The invention relates to the use of a complex comprising a protein and an alkylene glycol alginate, which can be used as an emulsifier/stabilizer in oil-in-water emulsions, and particularly in food systems such as acidic beverage systems.

DESCRIPTION OF THE PRIOR ART

Many food, beverage, and personal care products use emulsion systems such as oil-in-water or water-in-oil emulsion systems. Such systems are present in beverages, food comestibles such as fat substitutes, diet supplements, mayonnaise, dressings sauces, etc., and personal care products such as shampoos, dental creams, lotions, etc.

In the beverage industry, the most common form of flavor delivery is an oil/water flavor emulsion. Oil-in-water type emulsions are useful for flavor delivery in still or carbonated beverages and are prepared by emulsifying the flavor oil and/or triglycerides with protein-anionic polysaccharide complex polymers to produce stable liquid concentrates and beverages.

British Patent 1,494,912 discloses a complex of a protein and an alkylene glycol alginate. This complex is formed by the reaction of the two complexing components. Although several types of protein may be utilized as the protein component, a whey protein is preferred, and a preferred alkylene glycol alginate is recited, propylene glycol alginate. The weight ratio of the protein to the alkylene glycol alginate in the complex is within the range of from 50:1 to 1:5.

The complex of the '912 patent is useful as a food additive or a foam stabilizer. The sole example illustrating the use of the complex is as a stabilizer component, specifically in a salad dressing wherein a complex of whey protein and propylene glycol alginate, present in the complex in a weight ratio of 1:1, respectively, is included in the salad dressing in a concentration of 0.5% by weight.

Tokaev, et al., Die Nahrung, 31No. 8, 825–834 (1987) is a technical article setting forth a water soluble protein-acid polysaccharide mixture which stabilizes emulsions. Specifically, a casein-pectin mixture is taught. There is no disclosure of a complex of alkylene glycol alginares and a protein, employed as a beverage emulsifier and stabilizer.

U.S. Pat. No. 2,121,305 describes an emulsion which utilizes a fatty acid amino compound type emulsifier formed from the reaction product of an albumin with a higher saturated or unsaturated fatty acid or its substituent products.

U.S. Pat. No. 2,391,559 discloses a water soluble protein derivative obtained from milk whey, dissolved in an aqueous alkaline solution, included in a nonalcoholic soft drink, such as root beer, to provide a foaming head.

SUMMARY OF THE INVENTION

The present invention relates to an emulsifier/stabilizer comprised of a protein/alkylene glycol alginate polysaccharide complex polymer. The complex polymer is particularly adapted for employment in food systems such as acidic beverage systems.

DETAILED DESCRIPTION OF THE INVENTION

Protein/alkylene glycol alginate polysaccharide complex polymers of the present invention are used to stabilize oil-in-water emulsions or water-in-oil emulsions. Emulsions of these types are used in fat substitutes and replacers, e.g., spreads for butter and margarine replacement, lean meats, meat and poultry pumping, meat emulsions and re-structured foods, fish protein, low calorie and low fat products such as shortening replacers in the baking industry, soups, sauces and dressings, diet supplements, diet drinks, dairy products including frozen foods, e.g., yogurt and ice cream, mayonnaise and personal care products such as shampoo, dental creams and lotions. They are also useful in film forming applications for packaging, paper coating industrial films and foams, and industrial emulsions including water bound paints and dispersions.

Essential oil flavored soft drinks are prepared by first emulsifying the flavoring oils in water with an emulsifying agent, and then adding coloring matter and preservative to produce a flavor concentrate. The flavor concentrate is then combined with sugar syrup and citric acid to form a flavored syrup, which in turn is mixed with water, carbonated or not, for the final ready-to-be packaged drink.

The emulsion of ingredients forming the flavor concentrate must be stabilized to prevent the separation of oil which may result in ring or scum formation at the top of the packaged drink, and additionally to maintain the desired cloudy appearance characteristic of a stable emulsion.

In order to effect true emulsification, polymers must emulsify and coat the oil droplet completely so that the emulsion can be stable in concentrated form (flavor emulsion) as well as diluted form (beverage). Polymers with high thickening property but little emulsification are not useful in beverage applications since they form concentrates that are too viscous for handling and not stable upon dilution to beverage level.

Gum Arabic is regarded as the standard emulsifier/stabilizer for the beverage industry because of its unique molecular structure. Most beverage compositions are in the acidic pH range and the unique chemical structure of Gum Arabic contributes to the stability of both the flavor concentrate and the beverage at low pH. Further, Gum Arabic eliminates any undesirable interaction with anionic food color molecules, e.g., FD & C Yellow No. 6. Unfortunately, Gum Arabic fluctuates greatly in quality and supply. Accordingly, a substitute for Gum Arabic for employment in the beverage industry is desired. Said substitute should ideally be comprised of permitted food ingredients, taste clean, have little impact on sensory quality of the final product, require minimal processing and impart the desired emulsification and stabilization.

In beverage applications, Gum Arabic satisfies the requirements of emulsification, acid tolerance and is compatible with food colors. The present protein/alkylene glycol alginate complex exhibits similar characteristic functionalities as the natural gum, but at a much lower usage level, i.e., about one-tenth the usage level of Gum Arabic. Further, the present complex does not exhibit an unacceptably high viscosity, thereby providing sufficient emulsification and stabilization in both flavor emulsions and beverages.

The present invention provides a process for preparing a stable flavor emulsion employing a protein/anionic polysaccharide complex polymer which is an ideal replacement for Gum Arabic. The protein/anionic polysaccharide complex is formed at a pH below the isoelectric point of the component protein through electrostatic interaction of the positively charged protein and the negatively charged poly-saccharide. This bipolymeric complex functions as both an emulsifier and a stabilizer. Said complex molecule orients the protein hydrophobic sites towards the oil-water interface and forms a strong interfacial film. The alkylene glycol alginate carboxyl containing hydrophilic tail extends into the aqueous phase and provides both steric and charge stabilization. The unique structure of the present complex polymer is stable in acidic media and extremely tolerant to ionic stress (food color, e.g., yellow #6). Further, the complex exhibits functional properties that are not attainable with either protein or anionic polysaccharides at a low usage level. Also, the viscosity of the complex polymer at the level normally employed in beverages is low enough to maintain the liquidity of the emulsion.

The present complex can be formed between native proteins such as caseinate, whey protein concentrate, whey protein isolate and soy protein isolate and alkylene glycol alginate. The preferred alkylene glycol alginate is propylene glycol alginate. The process for forming the complex of the present invention comprises mixing the protein and alkylene glycol alginate solutions at protein to polysaccharide ratio of 0.5:1 to 5:1. A predetermined amount of flavor oil and/or triglyceride is added to the mixture with oil to polymer weight ratio of 3:1 to 8:1.

In order to achieve and maintain stability in a beverage, the flavoring oils must remain suspended in the aqueous beverage phase although they are essentially insoluble in this medium. The adverse effects resulting from "creaming" or "ringing" can be avoided by mixing a weighting agent (sometimes called density-adjusting agent) with the lighter weight flavoring oils and/or triglycerides. Weighting agents must meet two requirements: 1) they must be mutually soluble with the oils and 2) they must have specific gravities which are higher than that of the oils. Weighting agents function by mixing with and increasing the specific gravity of the flavoring oil-containing phase, until it becomes approximately the same as the aqueous phase, e.g., when weighting agents and flavor oils are mixed, the specific gravity of the resulting blend is closer to that of the aqueous phase than that of the unweighted flavor oils. Weighting agents thereby reduce the tendency of the flavoring oils to rise to the surface of the beverage. This aids in maintaining the oil droplets as an even dispersion throughout the beverage.

Said mixture is then acidified with suitable food grade acid solution to a pH below 4 to cause the formation of bipolymeric complex around the oil droplet. The acidified pre-emulsion is then homogenized to produce a stable emulsion. The homogenized emulsion can be added to a syrup base to impart flavor in the finished beverage.

The emulsifier of the present invention does not affect the sensory acceptability of the finished product and is prepared in a simple and economical manner.

The following examples are set forth to further illustrate the emulsifier/stabilizer complex of the present invention.

EXAMPLE 1

A beverage flavor emulsion was formulated to contain 0.4% whey protein isolate, 0.4% propylene glycol alginate, 5.36% weighted orange oil (containing ester gum) 0.26% sodium benzoate and 0.25% citric acid. The emulsion was produced by mixing 80 grams of 5% whey protein solution and 200 grams of 2% PG alginate solution, add 2.6 grams of benzoate, add 53.6 grams of orange oil to the mixture and mixed with paddle stirrer. The pre-emulsion was then diluted to 993.8 grams with distilled water and at this point, citric acid was added as 40% solution to adjust the pH to 3.9. The mixture was then homogenized twice by a Manton-Gaulin two stage homogenizer at 3500 and 500 psi first and second stages respectively.

Carbonated orange beverages were prepared by adding 1.33 ml of the flavor emulsion to 50 ml of a 54 Bx base syrup, and diluted five fold with carbonated water. The finished beverage contains:

| | |
|---|---|
| sucrose | 13.0% |
| orange flavor | 0.4% |
| citric acid | 0.16% |
| Na benzoate | 0.02% |
| FD&C yellow #6 | 50 ppm |
| $CO_2$ volume | 2.1 |

The flavor concentrate and beverages were stored at 40° F., 70° F. and 90° F. Products remained stable for more than three months at all temperatures. The beverages maintained their taste throughout the shelf life study.

EXAMPLE 2

Orange flavor emulsions were prepared using the following ingredients:

| | % (A) | % (B) | % (C) | % (D) |
|---|---|---|---|---|
| Whey protein | 0.4 | — | 0.4 | 5 |
| PG alginate | 0.4 | 0.6 | — | — |
| Flavor | 5.4 | 5.4 | 5.4 | 5.4 |
| Benzoate | 0.26 | 0.26 | 0.26 | 0.26 |
| Citric acid | 0.25 | adjust to pH 3.9 | | |
| water | 93.29 | make up to total vol | | |
| | 100.00 | 100.00 | 100.00 | 100.00 |
| pH | 3.9 | 3.9 | 3.9 | 3.9 |
| Stability | | | | |
| Concentrate* | good | creamed | curdled | good |
| Beverage** | good | neck ring | flocculated | flocculated |

*Method of preparation for A is the same as in Example 1, for B, C and D the oil was added to the polymer solution and stirred and proceeded the same manner as in Example 1.
**Beverages were prepared as described in Example 1.

As demonstrated in Example 2, neither propylene glycol (PG) alginate nor whey protein by itself can provide desirable stability in both the concentrate and beverage products. However, the protein/propylene glycol alginate system performed satisfactorily in both the concentrate and beverage products.

What is claimed is:

1. A method for emulsifying and stabilizing beverage produces comprising;

(a) mixing a complex of protein and alkylene glycol alginate with a predetermined amount of flavor oil to form a flavored solution;
(b) acidifying said flavored solution to cause the formation of a pre-emulsion bipolymeric complex;
(c) homogenizing said pre-emulsion complex to form a stable oil-in-water emulsion;
(d) adding said stable oil-in-water emulsion to a syrup base to form a flavoring complex; and
(e) adding said flavoring complex to a finished beverage product.

2. A method according to claim 1 wherein said protein and alkylene glycol alginate solutions are mixed at a protein to polysaccharide ratio of about 0.5:1 to about 5:1.

3. A method according to claim 2, wherein said flavor oil is added to said polymer solution in an oil to polymer weight ratio of about 3:1 to about 8:1.

4. The method according to claim 1 wherein said protein is selected from the group comprising gelatin, casein, whey protein concentrate, whey protein isolate and soy protein isolate.

5. The method of claim 1 wherein said alkylene glycol alginate is propylene glycol alginate.

6. The method according to claim 1 wherein said complex of protein and alkylene glycol alginate is formed at a pH below the isoelectric point of said protein.

7. The method of claim 1 wherein a density adjusting agent is added to said flavor oil.

8. The method of claim 1 wherein said flavor oil is a triglyceride.

9. The method of claim 8 wherein a density adjusting agent is added to said triglyceride.

10. A method for forming an emulsified and stable beverage comprising;
(a) forming a complex of protein and alkylene glycol alginate at a pH below the isoelectric point of said protein;
(b) adding to said complex a predetermined amount of flavor oil to form a flavored complex;
(c) acidifying said flavored complex to a pH below about 4, to form an acidified pre-emulsion; and
(d) adding said flavor emulsion to a syrup base to form a flavoring complex which can be added to a beverage product to impart flavor.

11. The method of claim 10 wherein a density adjusting agent is added to said flavor oil.

* * * * *